United States Patent
Mannion (10) Patent No.: US 6,553,448 B1
(45) Date of Patent: Apr. 22, 2003

(54) METHOD FOR UNIT DISTANCE ENCODING OF ASYNCHRONOUS POINTERS FOR NON-POWER-OF-TWO SIZED BUFFERS

(75) Inventor: David James Mannion, Northborough, MA (US)

(73) Assignee: 3Com Corporation, Santa Clara, CA (US)

( * ) Notice: Subject to any disclaimer, the term of this patent is extended or adjusted under 35 U.S.C. 154(b) by 107 days.

(21) Appl. No.: 09/797,202

(22) Filed: Mar. 1, 2001

(51) Int. Cl.[7] ............................................... G06F 12/00
(52) U.S. Cl. ........................... 711/2; 711/217; 711/218; 710/52; 377/108; 341/98
(58) Field of Search ........................... 711/2, 109, 156, 711/214, 217, 218; 710/52, 57; 365/189.07, 221; 377/34–35, 108; 341/10, 96–98

(56) References Cited

U.S. PATENT DOCUMENTS

| | | | | |
|---|---|---|---|---|
| 5,778,415 A | * | 7/1998 | Marietta et al. ................ | 711/5 |
| 5,978,868 A | * | 11/1999 | Maas ........................... | 710/52 |
| 6,327,207 B1 | * | 12/2001 | Sluiter et al. ................ | 365/221 |
| 6,337,893 B1 | * | 1/2002 | Pontius ....................... | 377/108 |
| 6,434,642 B1 | * | 8/2002 | Camilleri et al. ............. | 710/57 |

* cited by examiner

Primary Examiner—Do Hyun Yoo
Assistant Examiner—Nasser Moazzami
(74) Attorney, Agent, or Firm—Weingarten, Schurgin, Gagnebin & Lebovici LLP (57) ABSTRACT

A technique for encoding index values of asynchronous pointers for a non-power-of-two sized buffer that supports the unit distance property. The technique includes converting N+1 pointer index values corresponding to index locations 0 through N of the buffer from the natural binary-coded decimal format to a unit distance code format such as the gray code, adding a 0 bit in the MSB position of each of the N+1 converted pointer index values, adding a first pointer index value at index location N+1 equal to the pointer index value at index location N except that a 1 bit replaces the 0 bit in the MSB position, and adding a plurality of pointer index values at index locations greater than N+1 but less than or equal to N+n+1 that are equal to the first added pointer index value, where "n" equals the number of bits in each pointer index value prior to conversion. The 1 bits of the plurality of added pointer index values, starting with the LSB position and continuing with bit positions nearest the LSB, are then successively cleared until the pointer index value corresponding to the highest index location has a 1 bit in the MSB position and 0 bits in the remaining bit positions.

6 Claims, 6 Drawing Sheets

| Index Location | NBCD Pointer Index Value | UDC Pointer Index Value |
|---|---|---|
| 0 | 0 0 0 0 0 | 0 0 0 0 0 0 |
| 1 | 0 0 0 0 1 | 0 0 0 0 0 1 |
| 2 | 0 0 0 1 0 | 0 0 0 0 1 1 |
| 3 | 0 0 0 1 1 | 0 0 0 0 1 0 |
| 4 | 0 0 1 0 0 | 0 0 0 1 1 0 |
| 5 | 0 0 1 0 1 | 0 0 0 1 1 1 |
| 6 | 0 0 1 1 0 | 0 0 0 1 0 1 |
| 7 | 0 0 1 1 1 | 0 0 0 1 0 0 |
| 8 | 0 1 0 0 0 | 0 0 1 1 0 0 |
| 9 | 0 1 0 0 1 | 0 0 1 1 0 1 |
| 10 | 0 1 0 1 0 | 0 0 1 1 1 1 |
| 11 | 0 1 0 1 1 | 0 0 1 1 1 0 |
| 12 | 0 1 1 0 0 | 0 0 1 0 1 0 |
| 13 | 0 1 1 0 1 | 0 0 1 0 1 1 |
| 14 | 0 1 1 1 0 | 0 0 1 0 0 1 |
| 15 | 0 1 1 1 1 | 0 0 1 0 0 0 |
| 16 | 1 0 0 0 0 | 0 1 1 0 0 0 |
| 17 | 1 0 0 0 1 | 0 1 1 0 0 1 |
| 18 | | 1 1 1 0 0 1 |
| 19 | | 1 1 1 0 0 0 |
| 20 | | 1 1 0 0 0 0 |
| 21 | | 1 0 0 0 0 0 |

Fig. 1 - Prior Art

| Index Location | NBCD Pointer Index Value | UDC Pointer Index Value |
|---|---|---|
| 0 | 0000 | 0000 |
| 1 | 0001 | 0001 |
| 2 | 0010 | 0011 |
| 3 | 0011 | 0010 |
| 4 | 0100 | 0110 |
| 5 | 0101 | 0111 |
| 6 | 0110 | 0101 |
| 7 | 0111 | 0100 |
| 8 | 1000 | 1100 |
| 9 | 1001 | 1101 |
| 10 | 1010 | 1111 |
| 11 | 1011 | 1110 |
| 12 | 1100 | 1010 |
| 13 | 1101 | 1011 |
| 14 | 1110 | 1001 |
| 15 | 1111 | 1000 |

*Fig. 2 - Prior Art*

| Index Location | NBCD Pointer Index Value | UDC Pointer Index Value |
|---|---|---|
| 0 | 00000 | 00000 |
| 1 | 00001 | 00001 |
| 2 | 00010 | 00011 |
| 3 | 00011 | 00010 |
| 4 | 00100 | 00110 |
| 5 | 00101 | 00111 |
| 6 | 00110 | 00101 |
| 7 | 00111 | 00100 |
| 8 | 01000 | 01100 |
| 9 | 01001 | 01101 |
| 10 | 01010 | 01111 |
| 11 | 01011 | 01110 |
| 12 | 01100 | 01010 |
| 13 | 01101 | 01011 |
| 14 | 01110 | 01001 |
| 15 | 01111 | 01000 |
| 16 | 10000 | 11000 |
| 17 | 10001 | 11001 |

*Fig. 3 - Prior Art*

| Index Location | NBCD Pointer Index Value | UDC Pointer Index Value |
|---|---|---|
| 0 | 00000 | 000000 |
| 1 | 00001 | 000001 |
| 2 | 00010 | 000011 |
| 3 | 00011 | 000010 |
| 4 | 00100 | 000110 |
| 5 | 00101 | 000111 |
| 6 | 00110 | 000101 |
| 7 | 00111 | 000100 |
| 8 | 01000 | 001100 |
| 9 | 01001 | 001101 |
| 10 | 01010 | 001111 |
| 11 | 01011 | 001110 |
| 12 | 01100 | 001010 |
| 13 | 01101 | 001011 |
| 14 | 01110 | 001001 |
| 15 | 01111 | 001000 |
| 16 | 10000 | 011000 |
| 17 | 10001 | 011001 |
| 18 |  | 111001 |
| 19 |  | 111000 |
| 20 |  | 110000 |
| 21 |  | 100000 |

*Fig. 4*

| Index Location | NBCD Pointer Index Value | UDC Pointer Index Value |
|---|---|---|
| 0 | 0000 | 00000 |
| 1 | 0001 | 00001 |
| 2 | 0010 | 00011 |
| 3 | 0011 | 00010 |
| 4 | 0100 | 00110 |
| 5 | 0101 | 00111 |
| 6 | 0110 | 00101 |
| 7 | 0111 | 00100 |
| 8 | 1000 | 01100 |
| 9 | 1001 | 01101 |
| 10 | 1010 | 01111 |
| 11 | | 11111 |
| 12 | | 11110 |
| 13 | | 11100 |
| 14 | | 11000 |
| 15 | | 10000 |

METHOD FOR UNIT DISTANCE ENCODING OF ASYNCHRONOUS POINTERS FOR NON-POWER-OF-TWO SIZED BUFFERS

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to buffered systems, and more specifically to techniques for encoding asynchronous pointers for non-power-of-two sized buffers.

In a conventional buffered system, a buffer such as a First-In First-Out (FIFO) buffer is employed for passing data between two (2) independent and non-correlated clock domains, e.g., a read clock domain and a write clock domain. The conventional buffered system typically comprises read control circuitry in the read clock domain, and write control circuitry in the write clock domain. The read and write control circuitry are operative to control the reading/writing of data from/to the two (2) clock domains by way of the FIFO buffer.

In the conventional buffered system, a read clock signal is provided to the read control circuitry and the FIFO buffer, and a write clock signal is provided to the write control circuitry and the FIFO buffer. The read and write clock signals are typically non-correlated and asynchronous clocks. During a typical read clock cycle, the read control circuitry provides a read enable signal and a circular read pointer to the FIFO buffer to enable the reading of data from the storage location of the FIFO buffer pointed to by the read pointer. During a typical write clock cycle, the write control circuitry provides a write enable signal and a circular write pointer to the FIFO buffer to enable the writing of data to the storage location of the FIFO buffer pointed to by the write pointer. To ensure that (1) the FIFO buffer is not empty when attempting to read data from the FIFO buffer, and (2) the FIFO buffer is not full when attempting to write data to the FIFO buffer, the read and write control circuitry are configured to compare the respective index values of the asynchronous read and write pointers and assert a "FIFO empty flag" or a "FIFO full flag" based on the results of the comparison. For example, the read control circuitry may compare the respective index values of the read and write pointers, determine that the read cycle overlaps the write cycle (e.g., the read address equals the write address), and assert the FIFO empty flag to interrupt the read cycle and allow the write cycle to complete. Similarly, the write control circuitry may compare the respective index values of the read and write pointers, determine that the write cycle overlaps the read cycle (e.g., the write address equals the read address), and assert the FIFO full flag to interrupt the write cycle and allow the read cycle to complete. In this way, underflow and overflow conditions of the FIFO buffer can be determined and handled appropriately.

In the conventional buffered system, the read and write control circuitry employ a Unit Distance Code (UDC), e.g., the gray code, to encode the index values of the read and write pointers before comparing them. A UDC is characterized by the property that only one (1) bit changes when transitioning across adjacent index values of the code. This property is commonly known as the unit distance property. By encoding the index values of the read and write pointers using a UDC such as the gray code, the uncertainty error of the encoded index values can be limited to at most the previous index location.

One drawback of encoding the index values of the read and write pointers using a UDC such as the gray code is that this limitation in the uncertainty error generally holds only for power-of-two sized buffers. As mentioned above, the asynchronous read and write pointers employed in the conventional buffered system are circular pointers. This means that transitions may occur not only across adjacent index values of the read and write pointers, but also between the highest index value and index value zero (0). In a power-of-two sized buffer, only one (1) bit of the UDC normally changes when transitioning between the highest encoded index value and index value zero (0). However, when making such a transition in a non-power-of-two sized buffer, multiple bits of the UDC may change. Because multiple lines on the read pointer bus and/or the write pointer bus can have different timing delays, multiple bits simultaneously changing on the read and write pointer buses may result in invalid comparisons of the read and write pointer index values, thereby causing erroneous assertions of the FIFO empty and FIFO full flags. Moreover, limiting the type of buffers used in buffered systems to power-of-two sized buffers may result in excessively large buffers in some applications, thereby increasing manufacturing costs.

It would therefore be desirable to have a buffered system for passing data between two (2) independent and non-correlated clock domains. Such a buffered system would utilize a technique for encoding index values of asynchronous pointers that supports the unit distance property. It would also be desirable to have such a technique for encoding pointer index values that can be used with any non-power-of-two sized buffer.

BRIEF SUMMARY OF THE INVENTION

A buffered system is provided that utilizes a technique for encoding index values of asynchronous pointers for non-power-of-two sized buffers that supports the unit distance property. The buffered system includes at least one non-power-of-two sized buffer such as a first-in first-out buffer for passing data between two (2) independent and non-correlated read and write clock domains, read control circuitry for controlling the reading of data from the buffer including comparing encoded index values of asynchronous read and write pointers to determine an underflow condition of the buffer, and write control circuitry for controlling the writing of data to the buffer including comparing encoded index values of asynchronous read and write pointers to determine an overflow condition of the buffer.

The read and write control circuitry utilize a technique for encoding the read and write pointer index values that results in a minimally expanded set of encoded pointer index values supporting the unit distance property. The encoding technique includes converting N+1 pointer index values corresponding to index locations 0 through N from the natural binary-coded decimal format to a unit distance code format such as the gray code format. The encoding technique further includes adding a 0 bit in the most significant bit position of each of the N+1 pointer index values encoded in the unit distance code format; adding a first pointer index value corresponding to an index location N+1; adding at least one second pointer index value corresponding to at least an index location N+2; and, adding a last pointer index value corresponding to an index location greater than N+2 but less than or equal to N+n+1, where "n" is equal to the number of bits in each pointer index value prior to encoding. The first added pointer index value is equal to the pointer index value corresponding to the index location N with the exception that a 1 bit replaces the added 0 bit in the most significant bit position. The second added pointer index value is equal to the first added pointer index value with the exception that if a 0 bit is in the least significant bit position of the second added pointer index value, then the 1 bit in the bit position nearest the least significant bit is cleared— otherwise, if a 1 bit is in the least significant bit position of the second added pointer index value, then the 1 bit in the least significant bit position is cleared (i.e., the 1 bit in the right-most bit position is cleared). Similarly, 1 bits in the right-most bit positions of pointer index values corresponding to index locations greater than N+2 are successively cleared so that the last pointer index value has a 1 bit in the most significant bit position and 0 bits in the remaining bit positions. The encoding technique generates a minimally expanded set of encoded pointer index values supporting the unit distance property that includes at most n+1 index values more than the original set of pointer index values in the natural binary-coded decimal format. The non-power-of-two sized buffer is configured with a number of storage locations that is equal to the number of index values in the expanded set of encoded pointer index values.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which.

DETAILED DESCRIPTION OF THE INVENTION

Systems and techniques are disclosed for encoding index values of asynchronous pointers for non-power-of-two sized buffers. The encoded pointer index values provided by the presently disclosed invention support the unit distance property to limit the uncertainty error of the encoded index values to at most the previous index location.

Figure 1:
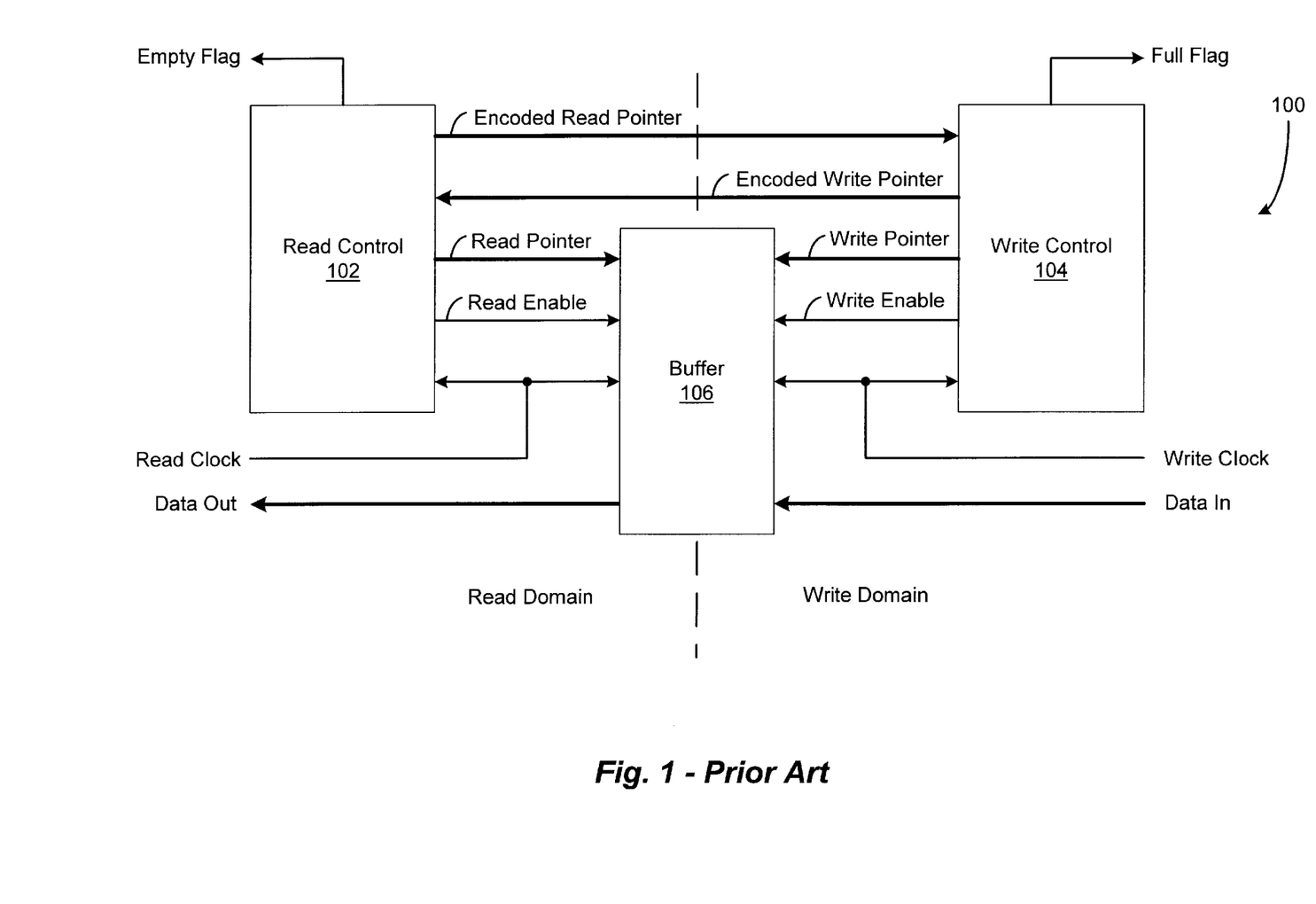
FIG. 1 is a block diagram depicting a conventional buffered system.

FIG. 1 depicts a block diagram of a conventional buffered system 100 traversing two (2) independent and non-correlated clock domains, e.g., a read clock domain ("read domain") and a write clock domain ("write domain"). The buffered system 100 includes a buffer such as a First-In First-Out (FIFO) buffer 106 configured for passing data from the write domain to the read domain, and read control circuitry 102 and write control circuitry 104 operative to control the FIFO buffer 106. Specifically, the FIFO buffer 106 receives data from at least one device (not shown) in the write domain by way of a Data In bus, and provides data to at least one device (not shown) in the read domain by way of a Data Out bus. A read clock signal ("read clock") is provided to the read control circuitry 102 and the FIFO buffer 106, and a write clock signal ("write clock") is provided to the write control circuitry 104 and the FIFO buffer 106. Because the read and write domains are independent and non-correlated clock domains, the read and write clocks are non-correlated, asynchronous clocks. During a typical read clock cycle of the buffered system 100, the read control circuitry 102 provides a read enable signal ("read enable") and a read pointer to the FIFO buffer 106 to enable the reading of data from the storage location of the FIFO buffer 106 pointed to by the read pointer. During a typical write clock cycle of the buffered system 100, the write control circuitry 104 provides a write enable signal ("write enable") and a write pointer to the FIFO buffer 106 to enable the writing of data to the storage location of the FIFO buffer 106 pointed to by the write pointer.

To ensure that (1) the FIFO buffer 106 is not empty when attempting to read data from the FIFO buffer 106, and (2) the FIFO buffer 106 is not full when attempting to write data to the FIFO buffer 106, the read and write control circuitry 102, 104 are configured to compare respective index values of the read and write pointers and assert a FIFO empty flag ("empty flag") or a FIFO full flag ("full flag") based on the results of the comparison to indicate a data access error condition. For example, the read control circuitry 102 may compare respective index values of the read and write pointers, determine that the read address equals the write address, and assert the empty flag signifying an underflow condition to interrupt the read clock cycle and allow the write clock cycle to complete. Similarly, the write control circuitry 104 may compare respective index values of the read and write pointers, determine that the write address equals the read address, and assert the full flag signifying an overflow condition to interrupt the write clock cycle and allow the read clock cycle to complete.

Specifically, the read and write control circuitry 102, 104 use a Unit Distance Code (UDC), e.g., the gray code, to encode the read and write pointer index values before comparing them. Accordingly, the read control circuitry 102 encodes the read pointer using a UDC such as the gray code, and provides the encoded read pointer to the write control circuitry 104. Similarly, the write control circuitry 104 encodes the write pointer using the UDC, and provides the encoded write pointer to the read control circuitry 102.

Those of ordinary skill in this art will appreciate that a UDC (e.g., the gray code) supports the unit distance property such that only one (1) bit of an index value of the code changes when transitioning across adjacent index values and, in applications that use circular pointers, when transitioning between the highest index value and index value zero (0). By encoding the circular read and write pointer index values using a UDC such as the gray code, the read and write pointer index values can be made to support the unit distance property. As a result, the uncertainty error of the encoded pointer index values can be limited to at most the previous index location. However, typical UDC's such as the gray code are normally used to encode index values of pointers for power-of-two sized buffers, e.g., a $2^{12}$ or 4096 byte buffer. Typical UDC's such as the gray code are not normally used to encode index values of circular pointers for non-power-of-two sized buffers because the unit distance property may not hold when transitioning between the highest index value and index value zero (0).

Figure 2:
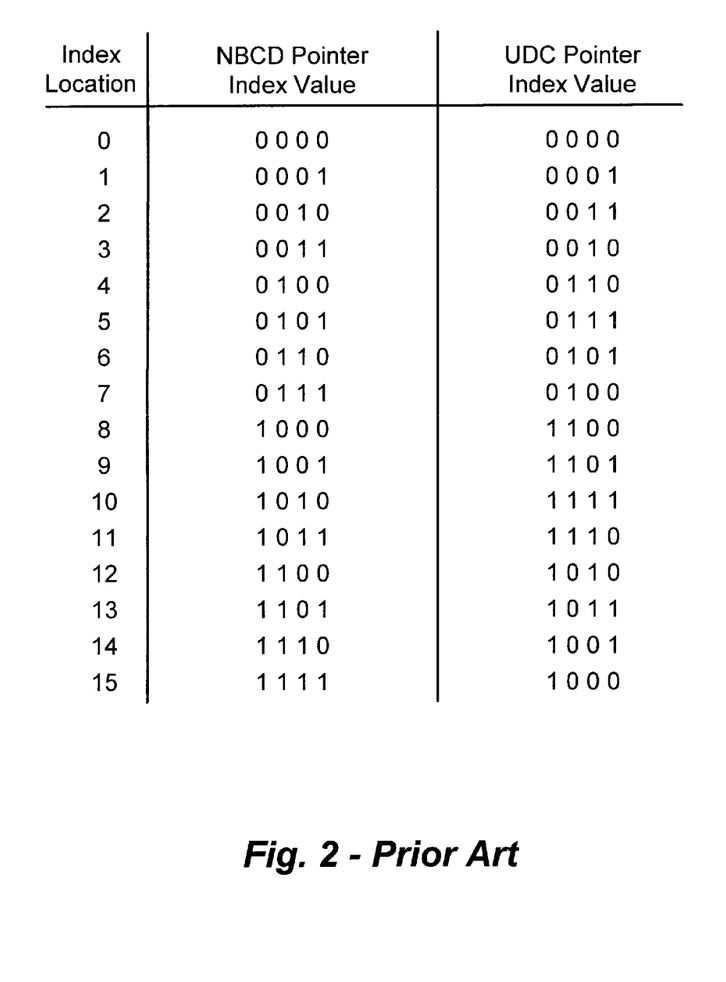
FIG. 2 is a table depicting pointer index values for a power-of-two sized buffer included in the buffered system of FIG. 1 in the natural binary-coded decimal format and corresponding pointer index values in a conventional unit distance code format.

For example, FIG. 2 depicts a table including sixteen (16) non-encoded and encoded pointer index values corresponding to index locations 0 through 15. Specifically, the sixteen (16) non-encoded pointer index values are in the Natural Binary-Coded Decimal (NBCD) format, and the encoded pointer index values are in a UDC, i.e., the gray code format. Further, the sixteen (16) NBCD pointers and the sixteen (16) UDC pointers are circular pointers for a power-of-two sized buffer, i.e., a $2^4$ or 16 byte buffer. As shown in FIG. 2, the unit distance property holds when transitioning across adjacent UDC pointer index values and when transitioning between the highest UDC pointer index value (i.e., index value 1000 corresponding to index location 15) and index value zero (i.e., index value 0000 corresponding to index location 0).

Figure 3:
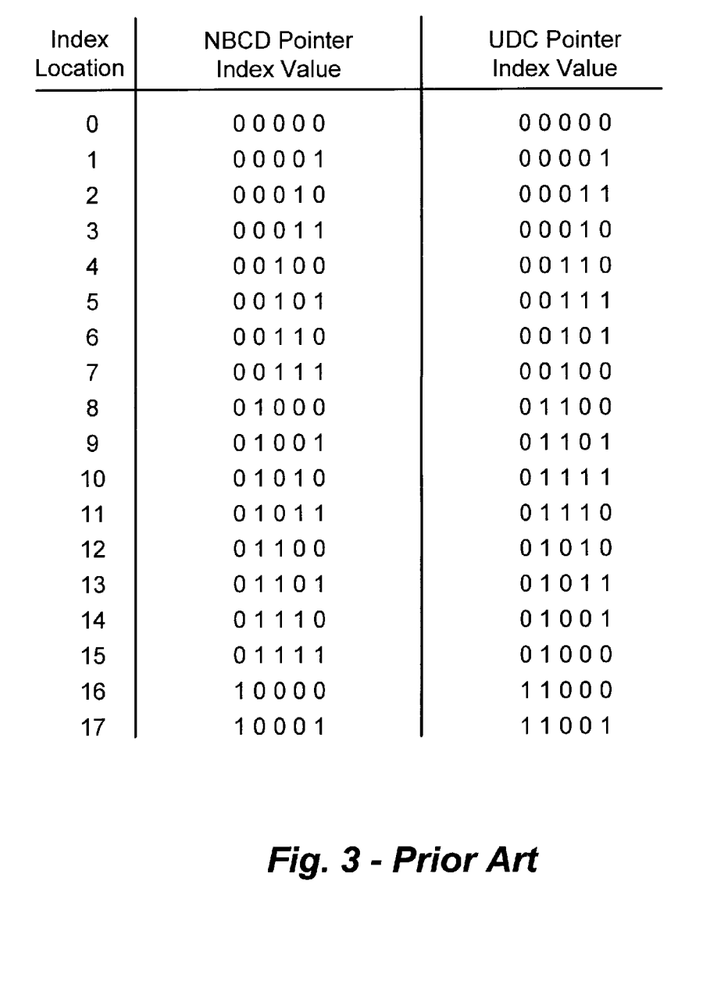
FIG. 3 is a table depicting pointer index values for a non-power-of-two sized buffer included in the buffered system of FIG. 1 in the natural binary-coded decimal format and corresponding pointer index values in a conventional unit distance code format.

In contrast, FIG. 3 depicts a table including eighteen (18) non-encoded and encoded pointer index values corresponding to index locations 0 through 17. Specifically, the eighteen (18) non-encoded pointer index values are in the NBCD format, and the encoded pointer index values are in the gray code format. In this case, the eighteen (18) NBCD pointers and the eighteen (18) UDC pointers are circular pointers for a non-power-of-two sized buffer. As shown in FIG. 3, although the unit distance property holds when transitioning across adjacent UDC pointer index values, the unit distance property does not hold when transitioning between the highest UDC pointer index value (i.e., index value 11001 corresponding to index location 17) and index value zero (i.e., index value 00000 corresponding to index location 0).

Figure 4:
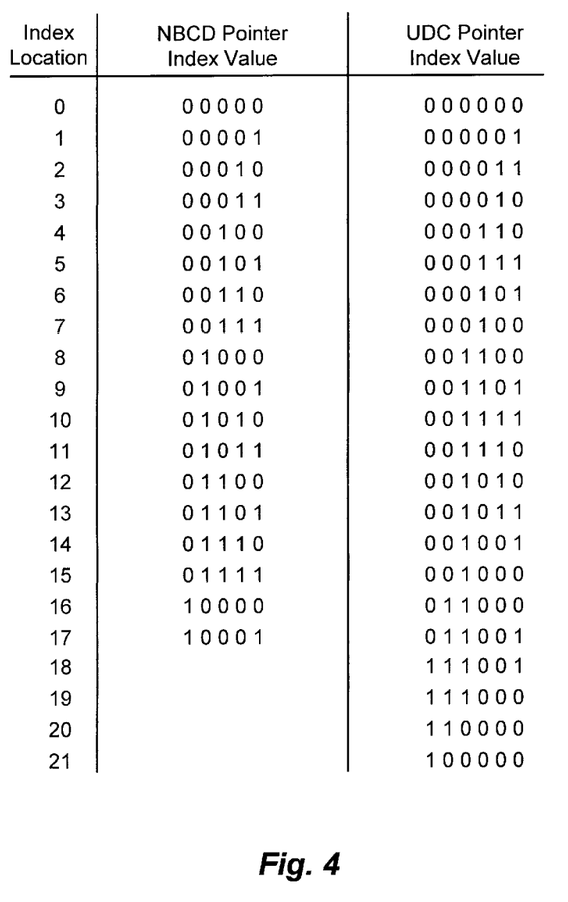
FIG. 4 is a table depicting pointer index values for a non-power-of-two sized buffer in the natural binary-coded decimal format and corresponding pointer index values in a unit distance code format according to the present invention.

FIG. 4 depicts a table including a set of eighteen (18) non-encoded pointer index values in the NBCD format and a minimally expanded set of twenty-two (22) pointer index values encoded by way of a technique according to the present invention. Although the twenty-two (22) UDC pointer index values of FIG. 4 are circular pointers for a non-power-of-two sized buffer, the unit distance property holds when transitioning across adjacent UDC pointer index values, and when transitioning between the highest UDC pointer index value (i.e., index value 100000 corresponding to index location 21) and index value zero (i.e., index value 000000 corresponding to index location 0). It should be understood that the encoded UDC pointer index values of FIG. 4 merely correspond to an exemplary twenty-two (22) byte buffer, and that the presently disclosed encoding technique may be suitably applied to any non-power-of-two sized buffer.

The encoding technique disclosed herein will be better understood with reference to the following illustrative examples, in which a set of index values of pointers for a non-power-of-two sized buffer is converted to a minimally expanded set of pointer index values supporting the unit distance property. In a first illustrative example, the set of eighteen (18) NBCD pointer index values of FIG. 3 is converted to the minimally expanded set of twenty-two (22) UDC pointer index values of FIG. 4. It is noted that the expanded set of UDC pointer index values corresponds to a set of pointers for a non-power-of-two sized buffer having twenty-two (22) storage locations.

In the first example, the set of eighteen (18) NBCD pointer index values corresponding to index locations 0 through 17 (i.e., N=17) is converted from the NBCD format to a UDC format such as the gray code. Accordingly, the eighteen (18) NBCD pointer index values are converted to the corresponding eighteen (18) UDC pointer index values in the gray code format, as shown in FIG. 3. It is noted that the number of bits, n, in each NBCD pointer index value equals the number of bits in each corresponding UDC pointer index value in the gray code format. In this first example, n=5.

Next, a 0 bit is added in the Most Significant Bit (MSB) position of each of the eighteen (18) UDC pointer index values in the gray code format. This is shown in FIG. 4, in which each of the UDC pointer index values corresponding to index locations 0 through 17 has a 0 bit in the MSB position. It is noted that the number of bits in each of these eighteen (18) UDC pointer index values is now equal to n+1=6.

A first UDC pointer index value corresponding to index location 18 (i.e., N+1=18) is then added to the eighteen (18) UDC pointer index values corresponding to index locations 0 through 17. This first added UDC pointer index value is equal to the UDC pointer index value corresponding to index location 17 with the exception that a 1 bit replaces the 0 bit in the MSB position (see FIG. 4).

Next, a second UDC pointer index value corresponding to index location 19 is added. This second added UDC pointer index value is equal to the first added UDC pointer index value with the exception that the 1 bit in the Least Significant Bit (LSB) position is cleared (see FIG. 4).

A third UDC pointer index value corresponding to index location 20 is then added. This third added UDC pointer index value is equal to the second added UDC pointer index value with the exception that the 1 bit in the bit position nearest the LSB is cleared (see FIG. 4).

Finally, a last UDC pointer index value corresponding to index location 21 is added. This last added UDC pointer index value is equal to the third added UDC pointer index value with the exception that the 1 bit in the bit position nearest the LSB is cleared (see FIG. 4). Accordingly, the last added UDC pointer index value has a 1 bit in the MSB position and 0 bits in the remaining bit positions.

In this first example, the presently disclosed encoding technique is used to encode the set of eighteen (18) NBCD pointer index values corresponding to index locations 0 through 17, thereby generating the minimally expanded set of twenty-two (22) UDC pointer index values corresponding to index locations 0 through 21 (see FIG. 4). It is noted that the expanded set of twenty-two (22) UDC pointer index values supports the unit distance property, i.e., only one (1) bit of each index value changes when transitioning across adjacent index values and when transitioning between the last added UDC pointer index value (100000) and index value zero (000000). Further, this expanded set of UDC pointer index values can be used as index values of pointers for a non-power-of-two sized buffer having twenty-two (22) storage locations.

In a second illustrative example, a set of eleven (11) NBCD pointer index values is converted to a minimally expanded set of sixteen (16) UDC pointer index values (see FIG. 5) corresponding to pointers for a buffer having sixteen (16) storage locations. This second example illustrates the worst-case scenario in which the expanded set of UDC pointer index values includes n+1 index values more than the original set of NBCD pointer index values, where "n" is equal to the number of bits in each NBCD pointer index value (i.e., n=4).

Figure 5:
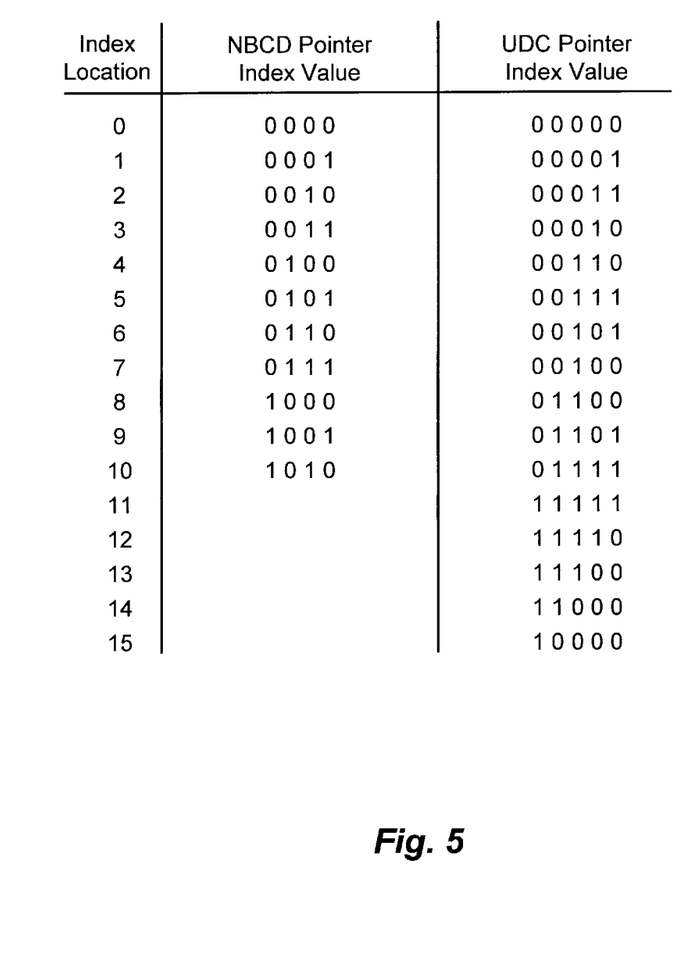
FIG. 5 is a table depicting pointer index values for another buffer in the natural binary-coded decimal format and corresponding pointer index values in the unit distance code format of FIG. 4.

As in the first example, the set of eleven (11) NBCD pointer index values corresponding to index locations 0 through 10 (i.e., N=10) is converted from the NBCD format to a UDC format such as the gray code format; and, a 0 bit is added in the MSB position of each of the eleven (11) UDC pointer index values in the gray code format to increase the number of bits included therein from four (i.e., n=4) to five (i.e., n+1=5).

Next, five (5) UDC pointer index values are added to the above-mentioned eleven (11) UDC pointer index values to form the minimally expanded set of sixteen (16) UDC pointer index values (see FIG. 5). As in the first example, the first added UDC pointer index value corresponding to index location 11 (i.e., N+1=11) is equal to the UDC pointer index value corresponding to index location 10 with the exception that a 1 bit replaces the added 0 bit in the MSB position (see FIG. 5). Further, 1 bits in bit positions nearest the LSB are successively cleared in the second, third, fourth, and last added UDC pointer index values corresponding to respective index locations 12 through 15, so that the last added UDC pointer index value corresponding to index location 15 has a 1 bit in the MSB position and 0 bits in the remaining bit positions.

In this second example, the presently disclosed encoding technique is used to encode the set of eleven (11) NBCD pointer index values corresponding to index locations 0 through 10, thereby generating the minimally expanded set of sixteen (16) UDC pointer index values corresponding to index locations 0 through 15 (see FIG. 5). It is noted that the expanded set of sixteen (16) UDC pointer index values supports the unit distance property. Moreover, the expanded set of UDC pointer index values includes n+1=5 index values more than the original set of NBCD pointer index values. According to the encoding technique disclosed herein, the expanded set of UDC pointer index values includes at most n+1 additional pointer index values. It is further noted that the expanded set of UDC pointer index values generated in this second example corresponds to a set of pointers for a power-of-two sized buffer having sixteen (16) storage locations.

Figure 6:
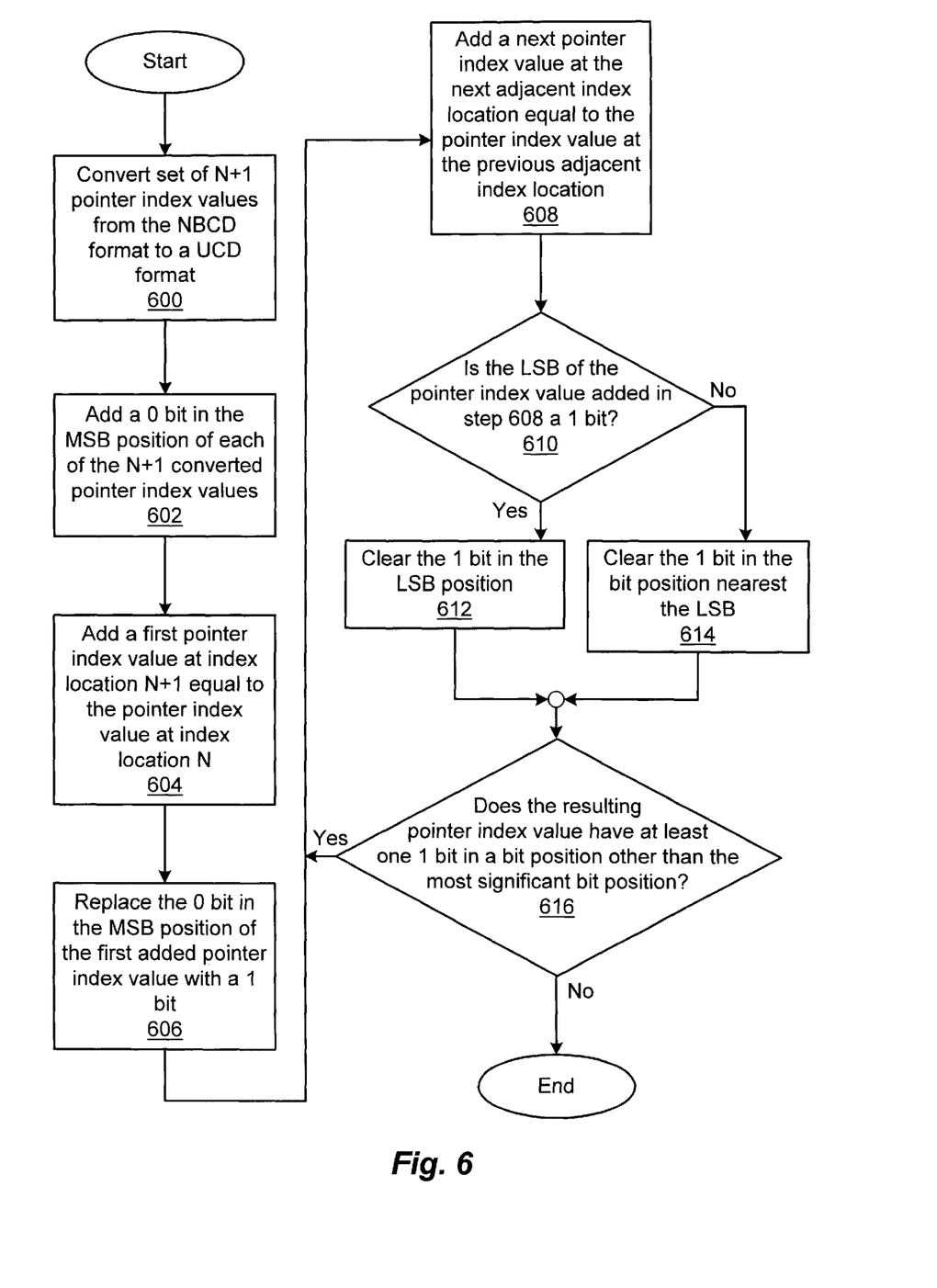
FIG. 6 is a flow diagram depicting a method of encoding pointer index values in the unit distance code format of FIG. 4.

The presently disclosed method of encoding index values of pointers for a non-power-of-two sized buffer is illustrated by reference to FIG. 6. It should be understood that the method steps depicted in FIG. 6 are merely exemplary, and that alternate method steps may be used to generate the encoded pointer index values. As depicted in step 600, a set of N+1 pointer index values corresponding to index locations 0 through N of the non-power-of-two sized buffer is converted from the NBCD format to a UDC format such as the gray code format. Next, a 0 bit is added, as depicted in step 602, in the MSB position of each of the N+1 pointer index values converted to the UDC format, thereby increasing the number of bits in each pointer index value from n to n+1. A first pointer index value equal to the pointer index value corresponding to index location N is then added, as depicted in step 604, to the set of converted pointer index values at index location N+1; and, the 0 bit in the MSB position of the first added pointer index value is replaced, as depicted in step 606, with a 1 bit. As depicted in step 608, a next pointer index value is added to the set of converted pointer index values at the next adjacent index location having a value equal to the pointer index value at the previous adjacent index location. A decision is then made, as depicted in step 610, as to whether the LSB of the pointer index value added in step 608 is a 1 bit. If so, then the 1 bit in the LSB position is cleared, as depicted in step 612. Otherwise, the 1 bit in the bit position nearest the LSB is cleared, as depicted in step 614. Next, a decision is then made, as depicted in step 616, as to whether the resulting pointer index value has at least one 1 bit in a bit position other than the most significant bit position. If so, then the method loops back to step 608. Otherwise, the method of encoding pointer index values ends. The resulting encoded pointer index values support the unit distance property and can be used as index values of asynchronous pointers for a buffer in a buffered system.

It will further be appreciated by those of ordinary skill in the art that modifications to and variations of the above-described system and methods may be made without departing from the inventive concepts disclosed herein. Accordingly, the invention should not be viewed as limited except as by the scope and spirit of the appended claims.

What is claimed is:

1. A method of encoding index values of at least one pointer for a buffer having a plurality of index locations, comprising the steps of:

generating a first set of pointer index values corresponding to N+1 index locations for a non-power-of-two sized buffer, each pointer index value in the first set having n bits;

generating a second set of M+1 pointer index values from the first set of N+1 pointer index values, $M \leq N+n+1$, each pointer index value in the second set having n+1 bits, in which each pointer index value in the second set differs from adjacent pointer index values in the second set by the value of a single bit, the last pointer index value in the second set being considered adjacent to the first pointer index value in the second set; and using the second set of pointer index values to access data stored in at least one of the plurality of index locations of the buffer.

2. The method of claim 1 wherein the second generating step includes the substeps of:

converting the first set of pointer index values to an intermediate set of consecutive pointer index values, each pointer index value in the intermediate set having n+1 bits and a 0 bit in the most significant bit position, and each pointer index value in the intermediate set differing from adjacent pointer index values in the intermediate set by the value of a single bit;

adding a first consecutive pointer index value to the intermediate set, the first consecutive pointer index value differing from the previous pointer index value adjacent thereto only by the value of the most significant bit;

adding a next consecutive pointer index value to the intermediate set to form the second set of pointer index values, the next consecutive pointer index value differing from the previous pointer index value adjacent thereto only by the right-most 1 bit of the previous pointer index value being cleared in the next consecutive pointer index value; and if the next consecutive pointer index value has at least one 1 bit in a bit position other than the most significant bit position, repeating the second adding step.

3. The method of claim 2 wherein the set of consecutive pointer index values generated in the generating substep is in the gray code format.

4. The method of claim 2 wherein the set of consecutive pointer index values generated in the generating substep includes N+1 pointer index values, wherein each of the N+1 pointer index values includes n bits, and wherein the next consecutive pointer index value corresponds to an index location less than or equal to N+n+1.

5. A buffered system for passing data between at least two clock domains, comprising:

at least one non-power-of-two sized buffer having N+1 index locations; and     control circuitry operative to control the access of data from the non-power-of-two sized buffer including comparing at least two pointer index values of M+1 consecutive pointer index values to determine an access error condition,     wherein the M+1 consecutive pointer index values are generated from an initial set of N+1 pointer index values for the non-power-of-two sized buffer, each pointer index value of the initial set having n bits, each pointer index value of the M+1 consecutive pointer index values having n+1 bits, and $MS \leq N+n+1$, and     wherein each one of the M+1 consecutive pointer index values differs from pointer index values adjacent thereto by the value of a single bit, the last pointer index value being considered adjacent to the first pointer index value of the M+1 consecutive pointer index values.

6. The system of claim 5 wherein the non-power-of-two sized buffer is a first-in first-out buffer.

* * * * *

UNITED STATES PATENT AND TRADEMARK OFFICE
CERTIFICATE OF CORRECTION

PATENT NO. : 6,553,448 B1
DATED : April 22, 2003
INVENTOR(S) : David James Mannion It is certified that error appears in the above-identified patent and that said Letters Patent is hereby corrected as shown below:

Column 10,
Line 6, "$M \leqq SN+n+1$" should read -- $M \leqq N+n+1$ --.

Signed and Sealed this

Twenty-second Day of June, 2004

JON W. DUDAS
*Acting Director of the United States Patent and Trademark Office*